(12) United States Patent
Makii

(10) Patent No.: US 7,426,069 B2
(45) Date of Patent: Sep. 16, 2008

(54) OPTICAL APPARATUS AND IMAGING APPARATUS

(75) Inventor: Tatsuo Makii, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/726,627

(22) Filed: Mar. 22, 2007

(65) Prior Publication Data

US 2007/0229934 A1 Oct. 4, 2007

(30) Foreign Application Priority Data

Mar. 28, 2006 (JP) .............................. 2006-086895

(51) Int. Cl.
*G02F 1/03* (2006.01)

(52) U.S. Cl. .................... 359/245; 359/484; 359/250; 359/251; 359/252; 359/266; 359/256; 359/259; 359/315; 359/316; 359/320

(58) Field of Classification Search ................. 359/484, 359/245, 250–252, 255, 256, 259, 315, 316, 359/320

See application file for complete search history.

(56) References Cited

U.S. PATENT DOCUMENTS

| 5,093,747 | A | 3/1992 | Dorschner |
| 5,266,988 | A | 11/1993 | Washisu et al. |
| 5,596,430 | A | 1/1997 | Hasegawa et al. |
| 5,963,682 | A | 10/1999 | Dorschner et al. |
| 7,057,787 | B2 * | 6/2006 | Cicchiello et al. ........... 359/251 |
| 2002/0154377 | A1 * | 10/2002 | Pepper ....................... 359/245 |

FOREIGN PATENT DOCUMENTS

| JP | 03-188430 A | 8/1991 |
| JP | 06148730 A | 5/1994 |
| JP | 2004 286935 A | 10/2004 |
| JP | 2005 099689 A | 4/2005 |

* cited by examiner

*Primary Examiner*—Evelyn A. Lester
(74) *Attorney, Agent, or Firm*—Lerner, David, Littenberg, Krumholz & Mentlik, LLP

(57) ABSTRACT

An optical apparatus is disclosed. The optical apparatus includes: a first optical element having a first polarizing layer containing a material having a refractive index that changes in accordance with the magnitude of applied voltage and first and second transparent electrodes sandwiching both sides of the first polarizing layer in the direction of thickness and polarizing light passing through the first polarizing layer in the direction of thickness; and a second optical element having a second polarizing layer containing a material having a refractive index that changes in accordance with the magnitude of applied voltage and third and fourth transparent electrodes sandwiching both sides of the second polarizing layer in the direction of thickness and polarizing light passing through the second polarizing layer in the direction of thickness.

10 Claims, 9 Drawing Sheets

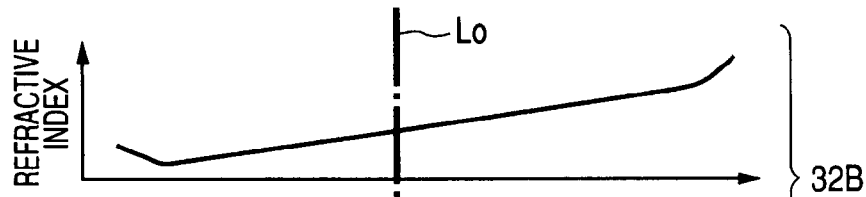
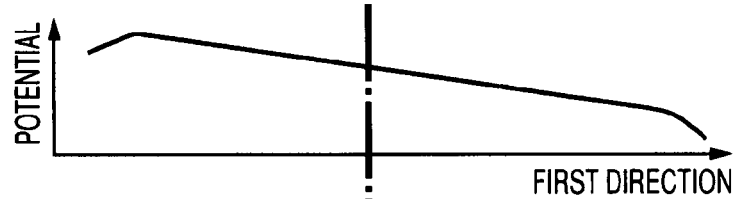
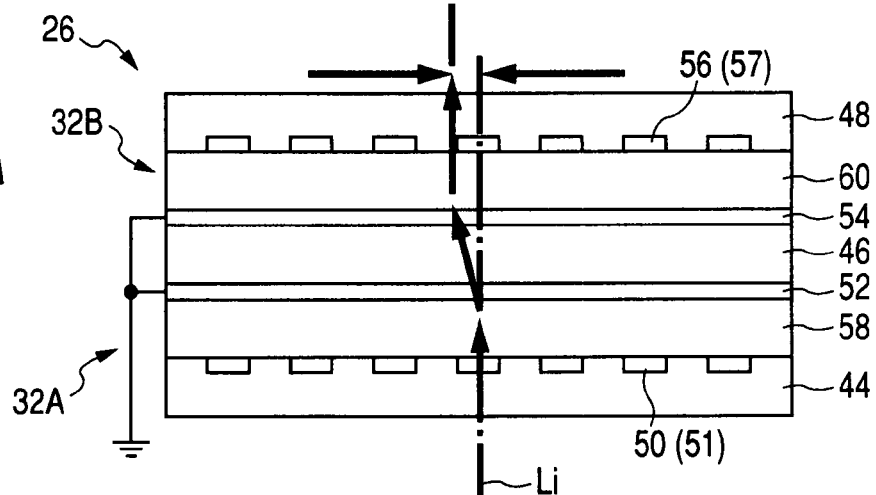
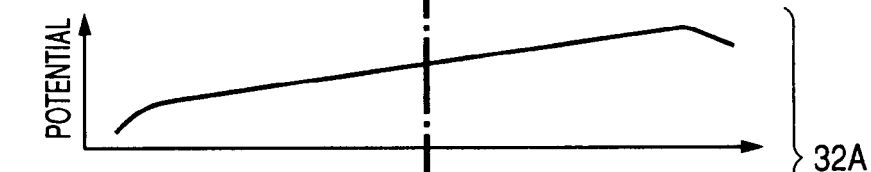
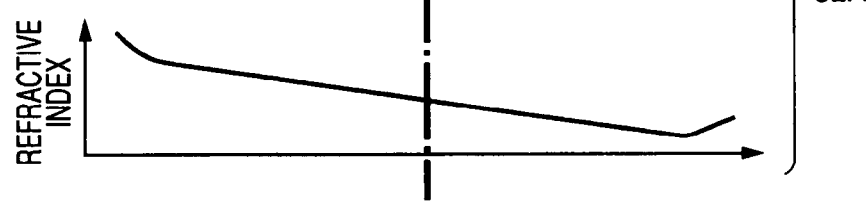

OPTICAL APPARATUS AND IMAGING APPARATUS

CROSS REFERENCES TO RELATED APPLICATIONS

The present invention contains subject matter related to Japanese Patent Application JP2006-086895 filed in the Japanese Patent Office on Mar. 28, 2006, the entire contents of which being incorporated herein by reference.

BACKGROUND OF THE INVENTION

1. Field of the Invention

The present invention relates to an optical apparatus and an imaging apparatus.

2. Description of the Related Art

There is an imaging apparatus such as a digital still camera that uses an imaging sensor to image a subject image captured by a shooting optical system.

When a camera shake occurs during a shooting operation by using an imaging apparatus, a forward motion occurs on the imaging plane of the imaging sensor, which results in a failure in shooting.

In order to prevent the occurrence of a forward motion, a forward motion compensating apparatus has been proposed (refer to JP-A-3-188430 (Patent Document 1)) in which a vibration of the imaging apparatus is detected by vibration detecting means such as an acceleration sensor, and a part of a lens in a shooting optical system is moved in the direction orthogonal to an optical axis by a lens driving mechanism such as a linear motor based on the detection result.

SUMMARY OF THE INVENTION

Such a forward motion compensating apparatus has a large space occupied by the lens driving mechanism and large power consumption, which is disadvantageous for the decreases in size and power consumption of the imaging apparatus.

Accordingly, it is desirable to propose an optical apparatus, which prevents a forward motion securely and, at the same time, is advantageous for the decreases in size and power consumption, and an imaging apparatus including the optical apparatus.

According to an embodiment of the present invention, there is provided an optical apparatus including a first optical element having a first polarizing layer containing a material having a refractive index that changes in accordance with the magnitude of applied voltage and first and second transparent electrodes sandwiching both sides of the first polarizing layer in the direction of thickness and polarizing light passing through the first polarizing layer in the direction of thickness, and a second optical element having a second polarizing layer containing a material having a refractive index that changes in accordance with the magnitude of applied voltage and third and fourth transparent electrodes sandwiching both sides of the second polarizing layer in the direction of thickness and polarizing light passing through the second polarizing layer in the direction of thickness, wherein the first and second optical elements are placed one over another in the direction of thickness of the first and second polarizing layers, the first and second transparent electrodes apply a first voltage that changes in magnitude in a stepwise manner or continuously to the first polarizing layer along a first direction orthogonal to the direction of thickness, and the third and fourth transparent electrodes apply a second voltage that changes in magnitude in a stepwise manner or continuously to the second polarizing layer along the first direction.

According to another embodiment of the invention, there is provided an imaging apparatus including a shooting optical system conducting a subject image, an image sensor on an optical axis of the shooting optical system, and an optical apparatus before the image sensor on the optical axis, wherein the optical apparatus has a first optical element having a first polarizing layer containing a material having a refractive index that changes in accordance with the magnitude of applied voltage and first and second transparent electrodes sandwiching both sides of the first polarizing layer in the direction of thickness and polarizing light passing through the first polarizing layer in the direction of thickness, and a second optical element having a second polarizing layer containing a material having a refractive index that changes in accordance with the magnitude of applied voltage and third and fourth transparent electrodes sandwiching both sides of the second polarizing layer in the direction of thickness and polarizing light passing through the second polarizing layer in the direction of thickness, wherein the first and second optical elements are placed one over another in the direction of thickness of the first and second polarizing layers, the first and second transparent electrodes apply a first voltage that changes in magnitude in a stepwise manner or continuously to the first polarizing layer along a first direction orthogonal to the direction of thickness, and the third and fourth transparent electrodes apply a second voltage that changes in magnitude in a stepwise manner or continuously to the second polarizing layer along the first direction.

According to the embodiments of the invention, an optical apparatus can displace the optical path by the simple construction including a first optical element having a first polarizing layer and first and second transparent electrodes and a second optical element having a second polarizing layer and third and fourth transparent electrodes. Thus, a smaller space may be required to occupy, and power for forming refractive index distributions in the first and second polarizing layers may be reduced.

Therefore, when the optical apparatus is used for compensating a camera shake in an imaging apparatus, a camera shake can be securely compensated, which is extremely advantageous for the decreases in size and power consumption.

BRIEF DESCRIPTION OF THE DRAWINGS

FIG. 5A is a section view of the optical apparatus 26; FIG. 5B is an explanatory diagram of a first electric field distribution applied to a first polarizing layer 58; FIG. 5C is an explanatory diagram of a first refractive index distribution of the first polarizing layer 58; FIG. 5D is an explanatory diagram of a second electric field distribution applied to a second polarizing layer 60; and FIG. 5E is an explanatory diagram of a second refractive index distribution of the second polarizing layer 60;

FIG. 7 is an explanatory diagram of an imaging apparatus 10 having two optical apparatus 26 built in;

DESCRIPTION OF THE PREFERRED EMBODIMENTS

First Embodiment

With reference to drawings, an embodiment of the invention will be described next.

An optical apparatus according to this embodiment of the invention is built in an imaging apparatus.

Figure 1:
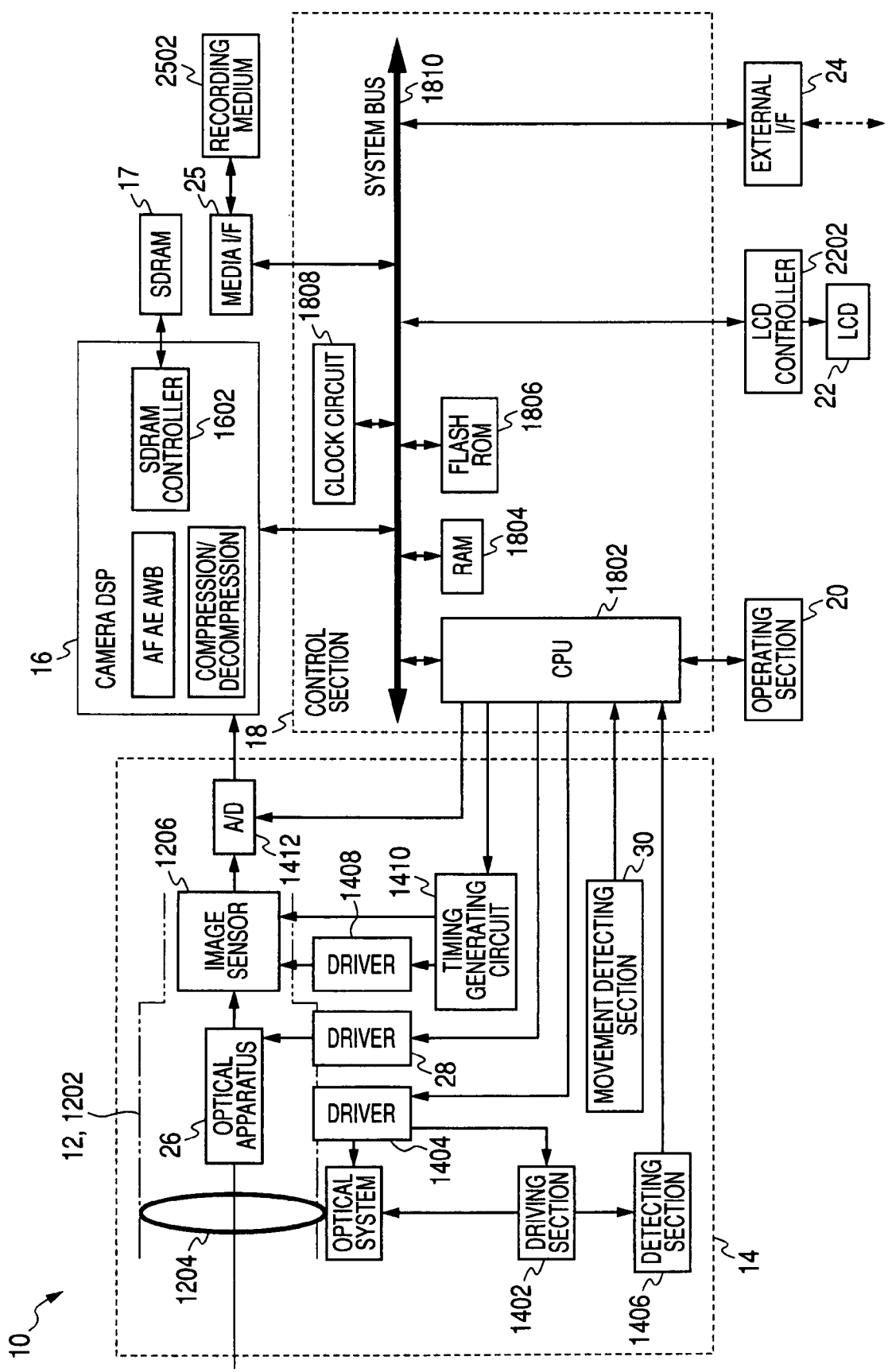
FIG. 1 is a block diagram showing a construction of an imaging apparatus 10.

FIG. 1 is a block diagram showing a construction of an imaging apparatus 10.

As shown in FIG. 1, the imaging apparatus 10 is a digital still camera.

The imaging apparatus 10 has an external case (not shown), and the case has a lens barrel 12, a driving unit 14, a signal processing section 16, a control section 18, an operating section 20, an LCD display 22, an external interface 24 and a media interface 25 built in.

The lens barrel 12 has a barrel 1202, and the barrel 1202 has a shooting optical system 1204 and an image sensor 1206 that images a subject image guided by the shooting optical system 1204. An optical apparatus 26 according to this embodiment of the invention is provided before the image sensor 1206 on the optical axis of the shooting optical system 1204.

The driving unit 14 has a driving section 1402, a driver 1404, a detecting section 1406, a driver 1408, a timing generating circuit 1410 and an A/D converter 1412. The driving section 1402 includes an actuator that drives a movable lens in the shooting optical system 1204. The driver 1404 supplies a drive signal to the driving section 1402. The detecting section 1406 detects a travel of the driving section 1402. The driver 1408 supplies a drive signal to the image sensor 1206. The timing generating circuit 1410 supplies a timing signal to the image sensor 1206 and the driver 1408. The A/D converter 1412 A/D-converts an imaged signal generated by the image sensor 1206.

The driving unit 14 further has a driver 28 and a movement detecting section 30. The driver 28 supplies a drive signal to the optical apparatus 26. The movement detecting section 30 includes an acceleration sensor and/or a gyrosensor that detects an amount of a camera shake of the imaging apparatus 10.

The signal processing section 16 may generate image data by performing predetermined signal processing on an imaged signal supplied from the A/D converter 1412 and perform various operations (such as auto-focus operation, automatic exposure operation, automatic white balance operation and compression/decompression of image data) relating to shooting. The signal processing section 16 may include a DSP, for example.

The signal processing section 16 uses a memory (SDRAM) 17 through an SDRAM controller 1602 as a work area for image data processing.

The control section 18 includes a CPU 1802, a RAM 1804, a flash ROM 1806, a clock circuit 1808, and a system bus 1810 connecting them.

The CPU 1802 operates based on a control program stored in the flash ROM 1806.

The CPU 1802 sends/receives data to/from the RAM 1804, flash ROM 1806 and clock circuit 1808 through the system bus 1810. The CPU 1802 further operates in accordance with an operation command supplied from the operating section 20, a detection signal supplied from the detecting section 1406, a detection signal supplied from the movement detecting section 30 and so on. The CPU 1802 further controls the drivers 1404 and 28, timing generating circuit 1410 and A/D converter 1412 of the driving unit 14.

The CPU 1802 further sends/receives data including image data to/from an internal memory or a recording medium 2502 such as a memory card through the media interface 25. The CPU 1802 further causes the display 22 to display image data through an LCD controller 2202. The CPU 1802 further sends/receives data including image data to/from an external apparatus (such as a personal computer and a printer) through the external interface 24.

The operating section 20 includes a power switch, a shutter button, and operation buttons for switching the shooting mode and performing various setting.

The optical apparatus 26 will be described next.

First of all, an optical element 32 in the optical apparatus 26 will be described.

Figure 2:
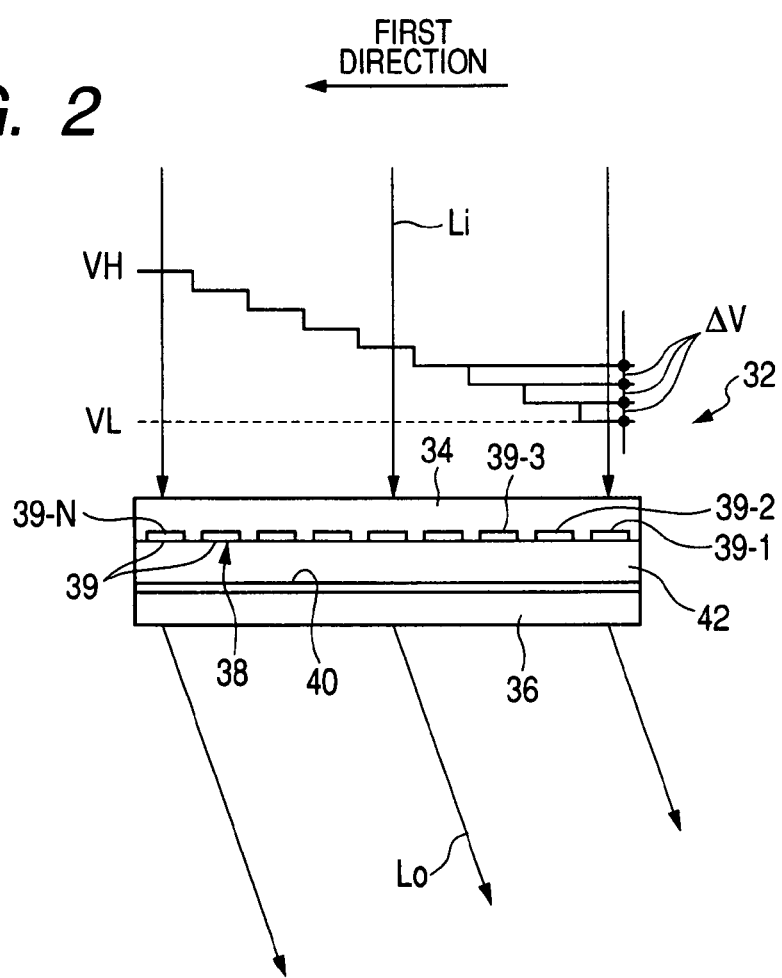
FIG. 2 is an explanatory diagram showing the principle of an optical element 32 in an optical apparatus 26.
Figure 3:
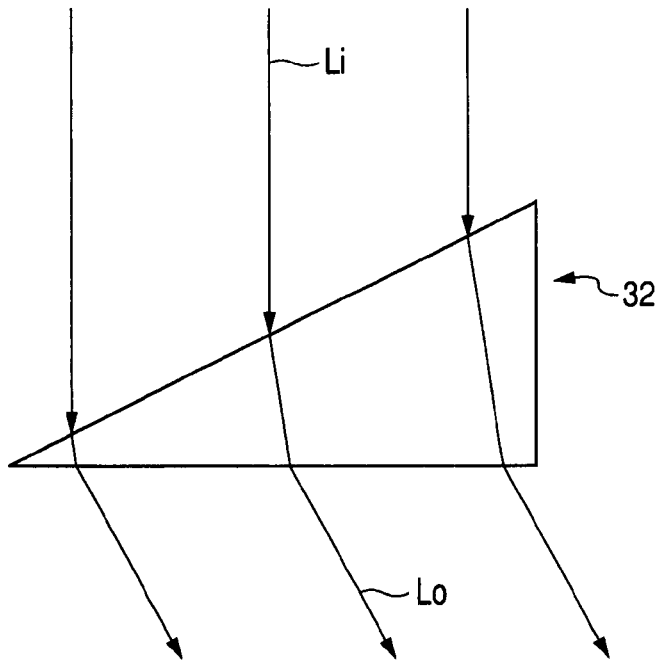
FIG. 3 is an explanatory diagram showing a prism effect of the optical element.

FIG. 2 is an explanatory diagram showing the principle of the optical element 32 in the optical apparatus 26, and FIG. 3 is an explanatory diagram of a prism effect of the optical element 32.

As shown in FIG. 2, the optical element 32 includes first and second transparent substrates 34 and 36 spaced apart from and extending in parallel with each other, first and second transparent electrodes 38 and 40 on the surfaces of the first and second transparent substrates 34 and 36, which face against each other, and a polarizing layer 42 filled between the first and second transparent electrodes 38 and 40.

The first transparent electrode 38 has multiple divided electrodes 39 in a band shape, which align at uniform intervals in the direction orthogonal to the direction of extension thereof. The direction that the multiple divided electrodes 39 align is referred as first direction, and the first direction is the direction orthogonal to the direction of thickness of the polarizing layer 42.

The second transparent electrode 40 includes a single electrode extending across the entire area of the surface of the second transparent substrate 36.

The polarizing layer 42 contains a material with a refractive index depending on the magnitude of the applied voltage. A medium with an anisotropic refractive index may be adopted as the material. The material may be but is not limited to:

1) nematic liquid crystal that has higher orientation and positive dielectric anisotropy in which the liquid crystal molecules change from the homogeneous orientation to the homeotropic orientation in accordance with the magnitude of the electric field applied between the substrates as in a general liquid crystal element;

2) nematic liquid crystal that has negative dielectric anisotropy in which the liquid crystal molecules change from the homeotropic orientation to the homogeneous orientation in accordance with the magnitude of the electric field applied between the substrates if a homeotropic orientation film is formed on the substrate surfaces; or 3) lithium tantalate ($LiTao_3$) or lithium niobate ($LiNbo_3$) with a refractive index depending on the magnitude of an applied electric field. Notably, lithium tantalate is generally known as one which can form a larger refractive index than that of liquid crystal.

Here, the potential at the ground level, for example, may be applied to the second transparent electrode 40 as a reference potential VL.

A voltage that changes in magnitude in a stepwise manner or serially along the first direction is applied to the multiple divided electrodes 39 in the first transparent electrode 38. The voltage may be a direct-current voltage (or alternate current voltage) of several to several tens V, for example.

For example, as shown in FIG. 2, the first transparent electrode 38 may include N divided electrodes 39-1, 39-2, 39-3, . . . and 39-N.

Here, the voltage to be applied to the divided electrode 39-1 at one end in the first direction is the reference voltage VL, and the voltage to be applied to the divided electrode 39-N at the other end in the first direction is the highest voltage VH. When the difference in voltage between adjacent divided electrodes is $\Delta V$, the voltage difference $\Delta V$ is expressed as:

$$\Delta V = (VH - VL)/(N-1) \quad \text{[EQ1]}$$

When a voltage that changes in magnitude in a stepwise manner or serially along the first direction is applied to the divided electrodes 39, the voltages applied to the polarizing layer 42 by the divided electrodes 39 in this way form an electric field distribution that changes in magnitude in a stepwise manner or serially along the first direction.

Thus, a refractive index distribution that changes in a stepwise manner or serially along the first direction is formed in the polarizing layer 42 in accordance with the electric field distribution.

With the formation of the refractive index distribution, an input light beam Li traveling in the direction of thickness of the polarizing layer 42 which is input to the first transparent electrode 38, is refracted by the polarizing layer 42 in accordance with the refractive index distribution and is output as an output light beam Lo from the second transparent substrate 36.

In other words, as shown in FIG. 3, the optical element 32 acts as a so-called prism, and the input light beam Li incident in the direction of thickness of the polarizing layer 42 is polarized and output as an output light beam Lo.

Next, the optical apparatus 26 will be described.

Figure 4:
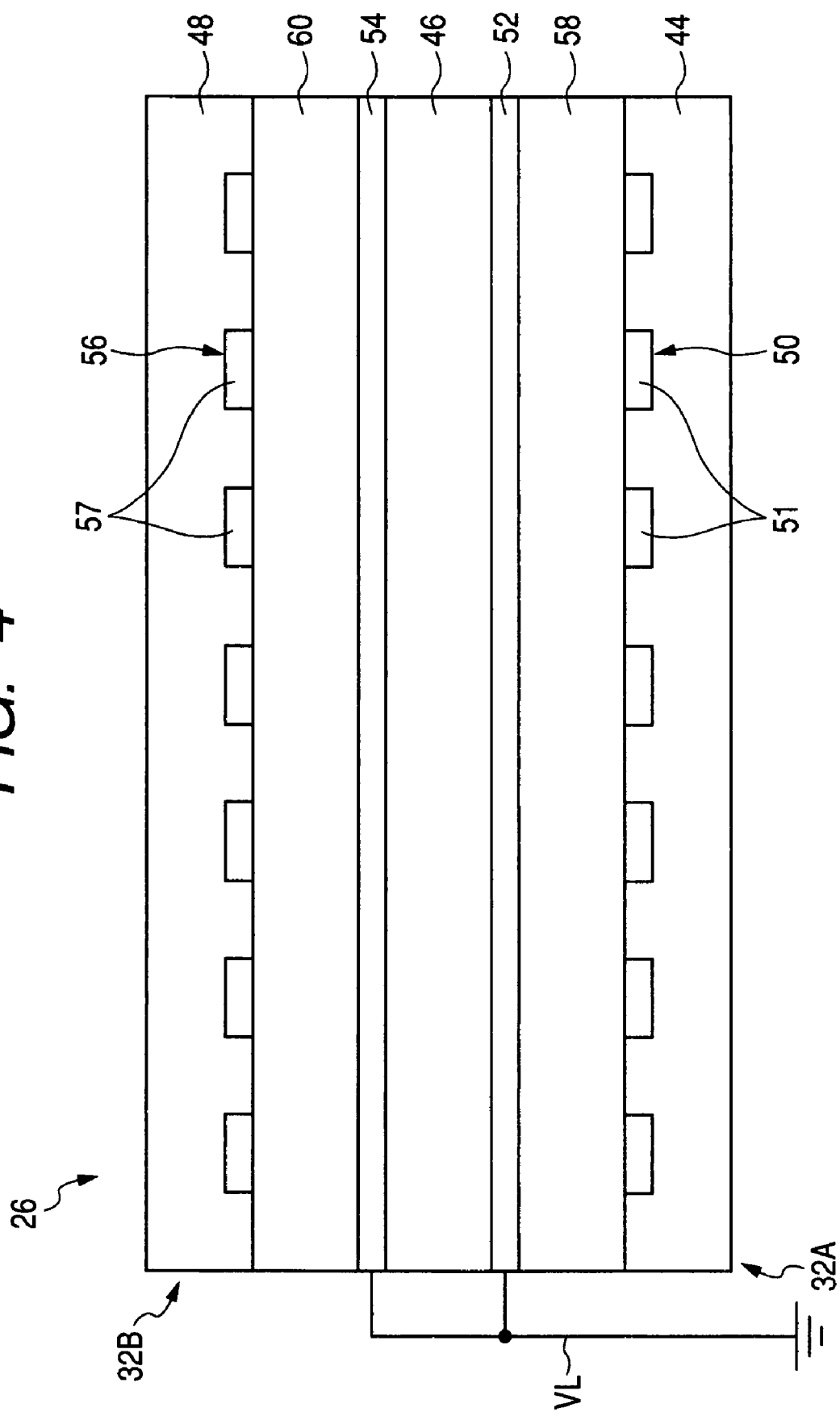
FIG. 4 is a section view showing a construction of the optical apparatus 26.

FIG. 4 is a section view showing a construction of the optical apparatus 26.

As shown in FIG. 4, the optical apparatus 26 includes first, second and third transparent substrates 44, 46 and 48, first to fourth transparent electrodes 50, 52, 54 and 56 and first and second polarizing layers 58 and 60.

The first, second and third transparent substrates 44, 46 and 48 are spaced apart from and extend in parallel with each other.

The first transparent electrode 50 is provided on the surface where the first transparent substrate 44 face against the second transparent substrate 46.

The second transparent electrode 52 is provided on the surface where the second transparent substrate 46 faces against the first transparent substrate 44.

The third transparent electrode 54 is provided on the surface where the second transparent substrate 46 faces against the third transparent substrate 48.

The fourth transparent electrode 56 is provided on the surface where the third transparent substrate 48 faces against the second transparent substrate 46.

The first polarizing layer 58 is filled between the first and second transparent electrodes 50 and 52.

The second polarizing layer 60 is filled between the third and fourth transparent electrodes 54 and 56.

The first and second polarizing layers 58 and 60 contain a material that changes in refractive index in accordance with the magnitude of the voltage applied thereto, like the polarizing layer 42.

Thus, according to this embodiment, the first and second transparent substrates 44 and 46, the first and second transparent electrodes 50 and 52, and the first polarizing layer 58 are included in a first optical element 32A. The second and third transparent substrates 46 and 48, the third and fourth transparent electrodes 54 and 56 and the second polarizing layer 60 are included in a second optical element 32B. In other words, the optical apparatus 26 includes the first and second optical elements 32A and 32B placed one over another in the direction of thickness of the first and second polarizing layers 58 and 60.

The first transparent electrode 50 has multiple divided electrodes 51 in a band shape, which align at uniform intervals in the direction orthogonal to the direction of extension of the band shape. The direction that the multiple divided electrodes 51 align is referred as first direction, and the first direction is the direction orthogonal to the direction of thickness of the first and second polarizing layers 58 and 60.

The second transparent electrode 52 includes a single electrode extending across the entire area of the surface where the second transparent substrate 46 faces the first polarizing layer 58.

The third transparent electrode 54 includes a single electrode extending across the entire area of the surface where the second transparent substrate 46 faces the second polarizing layer 60.

The fourth transparent electrode 56 has multiple divided electrodes 57 in a band shape, which align at uniform intervals in the direction orthogonal to the direction of extension of the band shape. The direction that the multiple divided electrodes 57 align agrees with the first direction.

According to this embodiment, the divided electrodes 51 and the divided electrodes 57 are similar in size and shape, and the divided electrodes 51 and divided electrodes 57 are placed such that the respective contours can agree with each other at the sight from the direction of thickness of the first and second polarizing layers 58 and 60.

Figure 6:
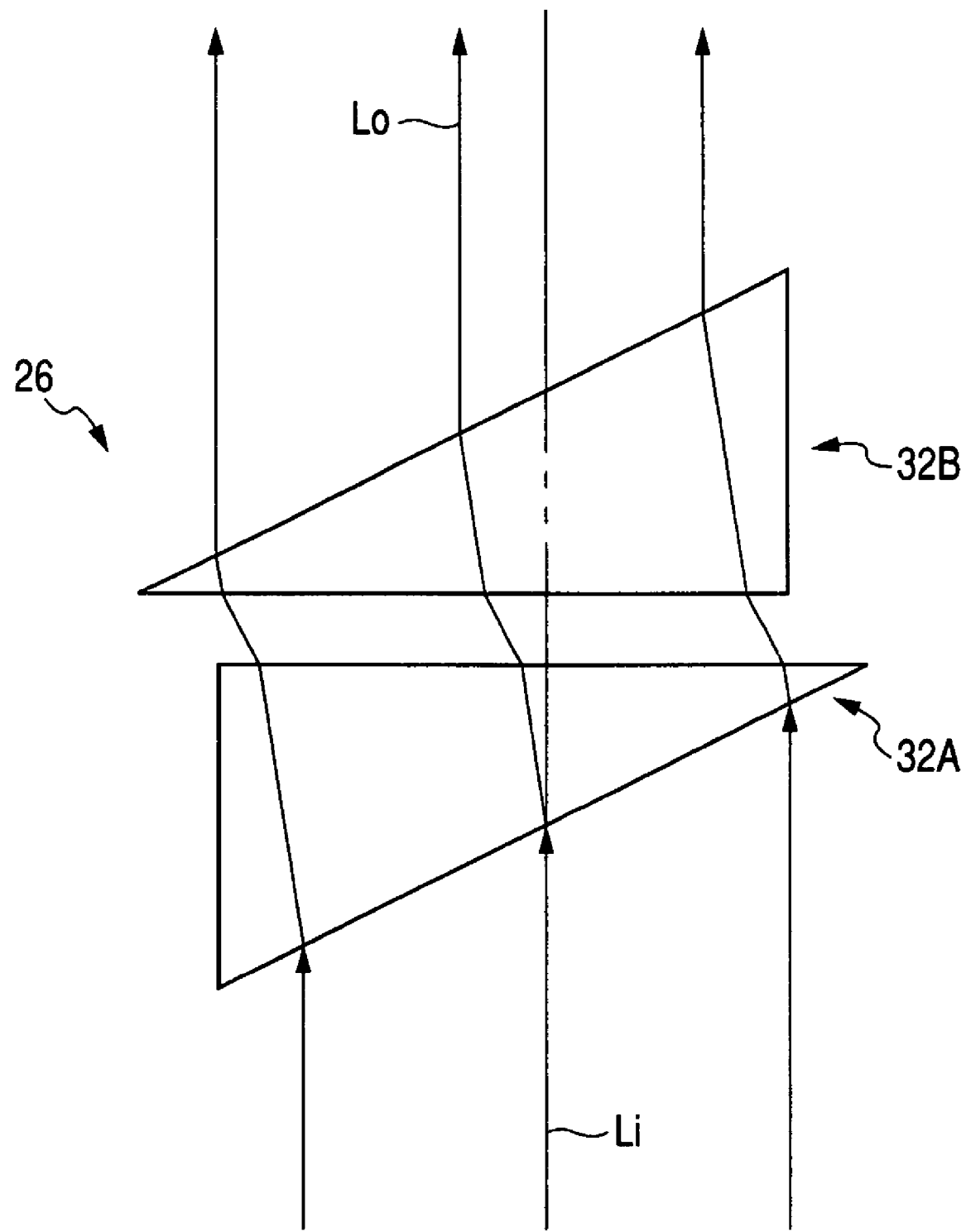
FIG. 6 is an explanatory diagram of prism effects of the optical apparatus 26.

FIG. 5A is a section view of the optical apparatus 26, FIG. 5B is an explanatory diagram of a first electric field distribution to be applied to the first polarizing layer 58, FIG. 5C is an explanatory diagram of a first refractive index distribution in the first polarizing layer 58, FIG. 5D is an explanatory diagram of a second electric field distribution to be applied to the second polarizing layer 60, and FIG. 5E is an explanatory diagram of a second refractive index distribution in the second polarizing layer 60. FIG. 6 is an explanatory diagram of prism effects of the optical apparatus 26.

As shown in FIG. 5A, the potential at the ground level, for example, may be commonly applied as the reference voltage VL to the second and third transparent electrodes 52 and 54.

A voltage that changes in magnitude in a stepwise manner or serially is applied to the multiple divided electrodes 51 in the first transparent electrode 50 and the multiple divided electrodes 57 in the fourth transparent electrode 56 along the first direction, like in the optical element 32.

Thus, as shown in FIG. 5B, the voltage forms a first electric field distribution in the first polarizing layer 58. The first electric field distribution changes in magnitude in a stepwise manner or serially along the first direction. As shown in FIG. 5D, the voltage forms a second electric field distribution in the second polarizing layer 60. The second electric field distribution changes in magnitude in a stepwise manner or serially along the first direction.

Therefore, as shown in FIG. 5C, a first refractive index distribution that changes in a stepwise manner or serially is formed in the first polarizing layer 58 in accordance with the first electric field distribution. As shown in FIG. 5E, a second refractive index distribution that changes in a stepwise manner or serially is formed in the second polarizing layer 60 in accordance with the second electric field distribution.

Here, the gradient of the first electric field distribution and the gradient of the second electric field distribution are opposite in polarity of the rate of change along the first direction and are the same in absolute value of the rate of change. As a result, the gradient of the first refractive index distribution and the gradient of the second refractive index distribution are opposite in polarity of the rate of change along the first direction and are the same in absolute value of the rate of change.

With the formation of the refractive index distributions, the input light beam Li traveling in the direction of thickness of the first and second polarizing layers 58 and 60 and entering to the first transparent substrate 44 is refracted by the first polarizing layer 58 in accordance with the first refractive index distribution, passes through the second transparent substrate 46, is refracted by the second polarizing layer 60 in accordance with the second refractive index distribution and is output from the third transparent substrate 48 as an output light beam Lo, as shown in FIG. 5A.

In other words, as shown in FIG. 6, the optical apparatus 26 (that is, the first and second optical elements 32A and 32B) acts as two prisms, and the input light beam Li incident in the direction of thickness of the polarizing layer 42 is polarized twice and is then output as the output light beam Lo.

In this case, the polarization of the input light beam Li by the optical apparatus 26 twice displaces the output light beam Lo in parallel with the extension line of the input light beam Li and in the first direction.

The amount of displacement of the output light beam Lo with reference to the extension line of the input light beam Li in the first direction, that is, the amount of displacement of the optical path displaced by the optical apparatus 26 depends on the magnitudes of the gradients of the first and second refractive index distributions.

Therefore, changing the magnitude of the voltage to be applied to the first and fourth transparent electrodes 50 and 56 and changing the gradients of the first and second electric field distributions allow the adjustment of the amount of displacement of the optical path.

Notably, the light polarized by the first optical element 32A travels within the second transparent substrate 46 in parallel with the input light beam Li and is then polarized by the second optical element 32B. Therefore, changing the dimension of the second transparent substrate 46 in the direction of thickness allows the adjustment of the amount of displacement of the optical path.

Next, an operation for compensating a camera shake by using the optical apparatus 26 in the imaging apparatus 10 will be described.

As shown in FIG. 1, based on the amount of a movement detected by the movement detecting section 30, the CPU 1802 calculates an amount of displacement (amount of correction) of the optical path by the optical apparatus 26, which may be required for compensating the amount of the movement.

Then, the CPU 1802 supplies a control signal to the driver 28 based on the amount of displacement. Thus, the voltage the magnitude of which corresponds to the amount of displacement (amount of correction) is applied from the driver 28 to the first and fourth transparent electrodes 50 and 56 of the optical apparatus 26.

Therefore, the amount of displacement (amount to be compensated) of the optical path by the optical apparatus 26 can be adjusted so as to correspond to the amount of the movement detected by the movement detecting section 30, which compensates the forward motion of the subject image guided to the image sensor 1206.

Since the optical apparatus 26 alone only displaces the optical path into the first direction, providing one optical apparatus 26 can only compensate a forward motion in one axis direction orthogonal to the optical axis of the shooting optical system 1204.

Figure 7:
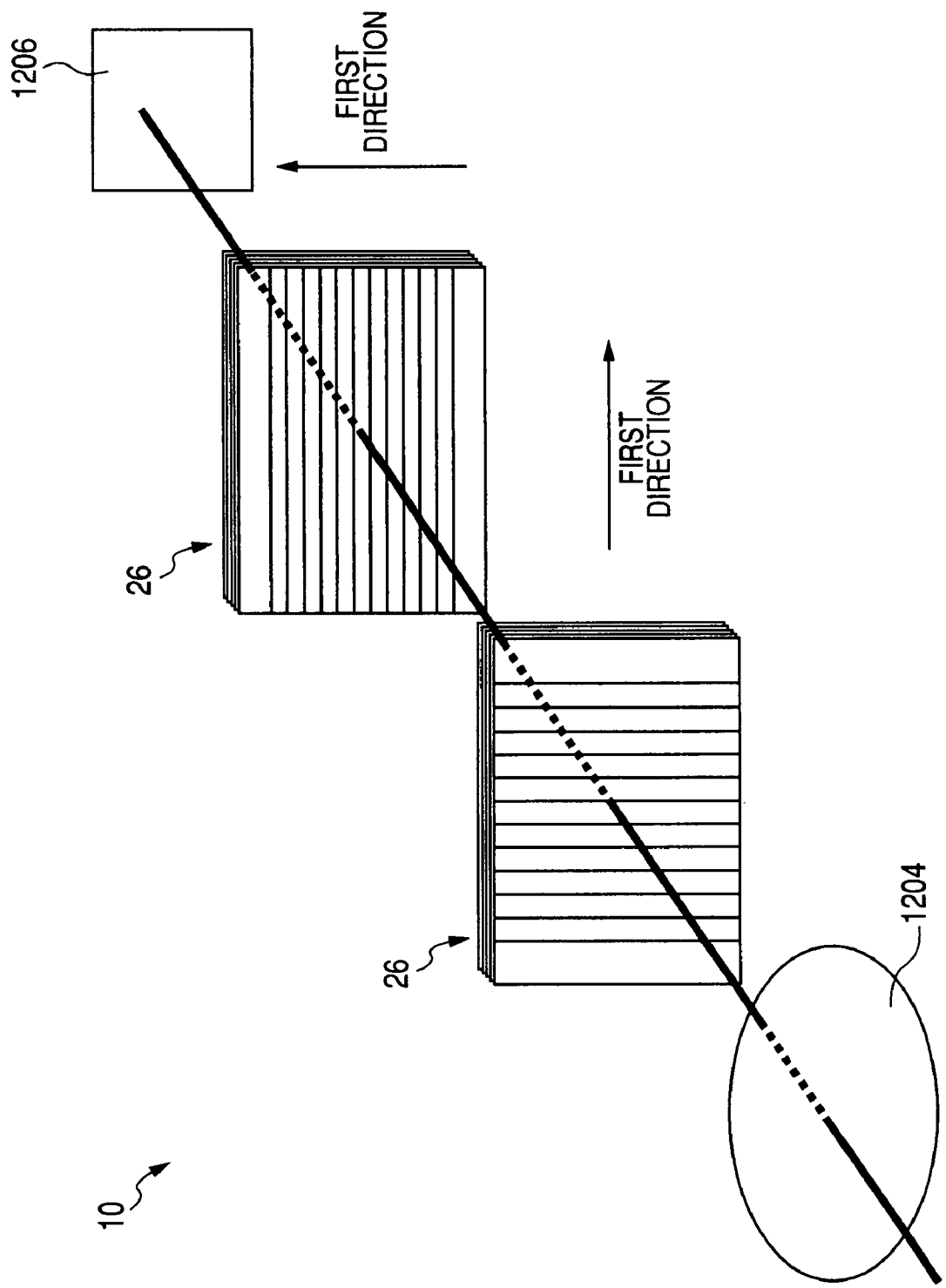

FIG. 7 is an explanatory diagram of the imaging apparatus 10 having two optical apparatus 26 built in.

As shown in FIG. 7, two optical apparatus 26 are placed before the image sensor 1206 on the optical axis of the shooting optical system 1204 such that the first directions of the two optical apparatus 26 can be orthogonal to the optical path. Thus, for example, the first direction of one of the two optical apparatus 26 can be horizontal, and the first direction of the other optical apparatus 26 can be vertical. Therefore, the optical path can be displaced in all directions orthogonal to the optical axis, and forward motions in all directions can be compensated.

According to this embodiment, the simple construction of the optical apparatus 26 including the first optical element 32A having the first and second transparent electrodes 50 and 52 sandwiching the first polarizing layer 58 and the second optical element 32B having the third and fourth transparent electrodes 54 and 56 sandwiching the second polarizing layer 60 may only require a small space to occupy and a small amount of power for forming the refractive index distributions in the first and second polarizing layers 58 and 60.

Thus, the use of the optical apparatus 26 for the camera shake compensation of the imaging apparatus 10 can apparently compensate a camera shake securely and is extremely advantageous for reducing the size and power consumption more than the case that a lens is moved by an actuator as in the past.

Since, according to this embodiment, the output light beam Lo is parallel to the line of extension of the input light beam Li of the optical apparatus 26 and is displaced in the first direction, the light guided to the image sensor 1206 by the shooting optical system 1204 is displaced in parallel with the optical axis of the shooting optical system 1204, which may advantageously compensate a one-sided blur in a subject image formed on the image sensor 1206.

Having described the case that the first and fourth transparent electrodes 50 and 56 have the multiple divided electrodes 51 and 57 in a band shape and the second and third transparent electrodes 52 and 54 have the single electrode according to this embodiment, the first and fourth transparent electrodes 50 and 56 may have a single electrode, and the second and third transparent electrodes 52 and 54 may have multiple divided electrodes.

The first and second transparent electrodes 50 and 52 and the third and fourth transparent electrodes 54 and 56 may only require to form an electric field distribution that changes in magnitude in a stepwise manner or serially along the first direction in the first and second polarizing layers 58 and 60, and the form is not limited.

Second Embodiment

A second embodiment will be described next.

The second embodiment is different from the first embodiment in that a dielectric layer is provided between a transparent electrode and a polarizing layer.

Figure 8:
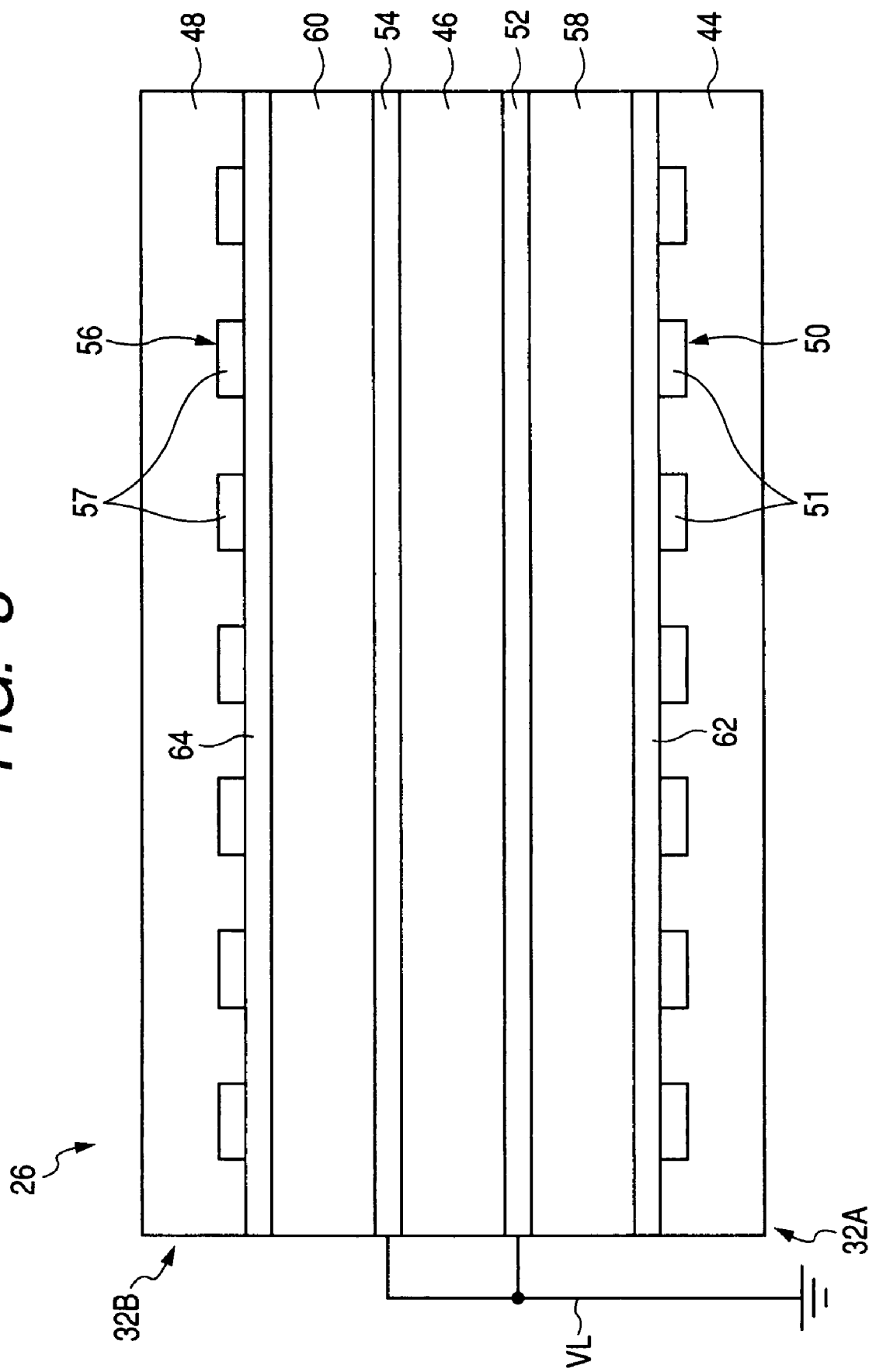
FIG. 8 is a section view showing a construction of an optical apparatus 26 according to a second embodiment.

FIG. 8 is a section view showing a construction of an optical apparatus 26 according to the second embodiment. In the description of this embodiment, the same reference numerals are given to the same or like parts and members as those in the first embodiment.

As shown in FIG. 8, a dielectric layer 62 is provided between the first transparent electrode 50 and the first polarizing layer 58, and a dielectric layer 64 is provided between the fourth transparent electrode 56 and the second polarizing layer 60. The dielectric layers 62 and 64 may be only required to contain a dielectric material that allows light to pass through and may contain a clear synthetic resin or clear glass.

The second embodiment certainly provides the same effects as those of the first embodiment and can prevent an uneven electric field occurring between the adjacent divided electrodes 51 and 57 from being applied to the polarizing layers 58 and 60 by providing the dielectric layers 62 and 64.

Thus, the gradients of the electric field distributions formed in the first and second polarizing layers 58 and 60 by the first and second transparent electrodes 50 and 52 and the third and fourth transparent electrodes 54 and 56, that is, the gradients of the refractive index distributions can be smoothed, which is advantageous for preventing the occurrence of the aberration in the optical apparatus 26 and for improving the quality of a subject image formed in the image sensor 1206.

Third Embodiment

A third embodiment is a variation example of the second embodiment and is different from the second embodiment in that the second and third transparent electrodes 52 and 54 also include divided electrodes in a band shape.

Figure 9:
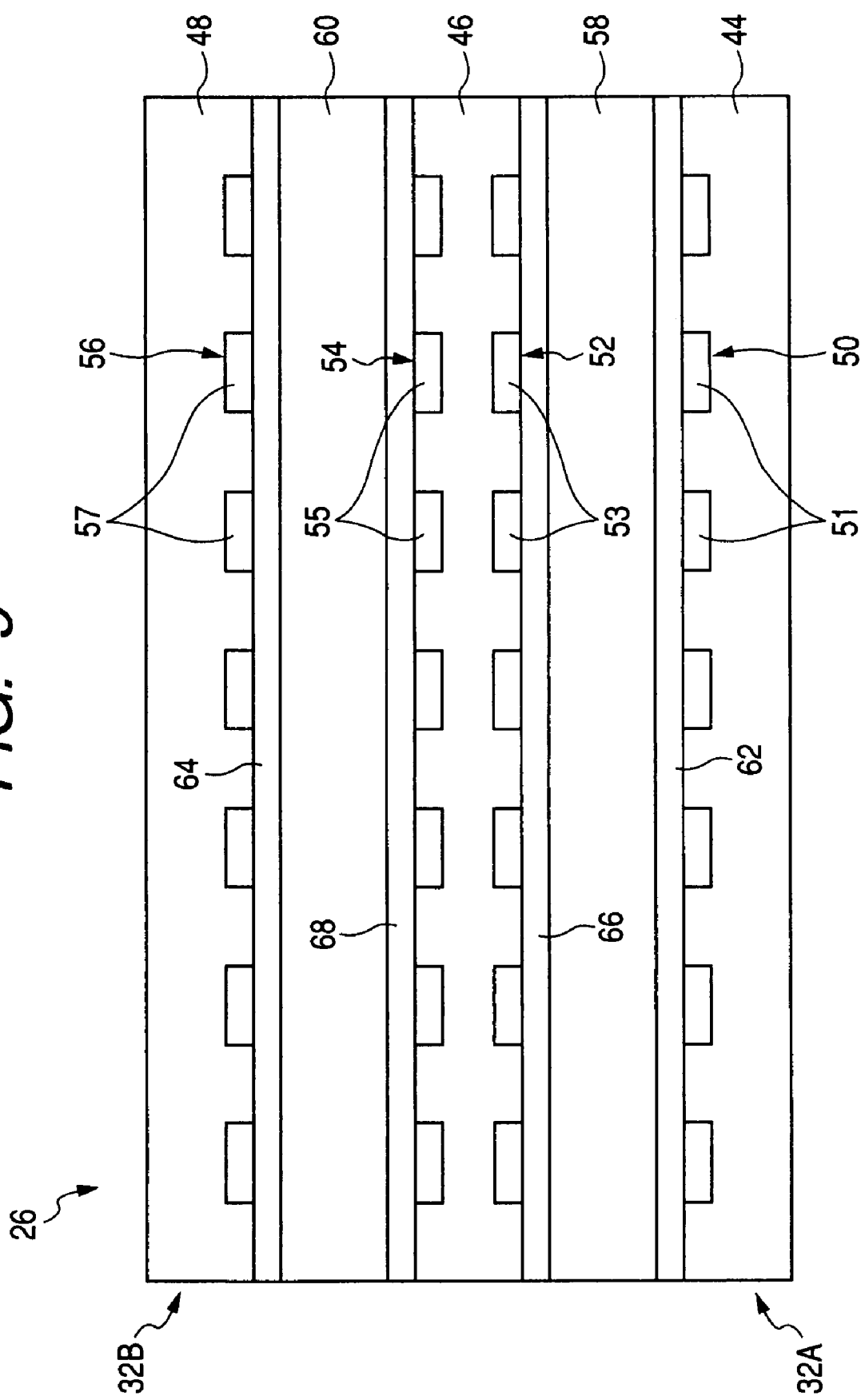
FIG. 9 is a section view showing a construction of an optical apparatus 26 according to a third embodiment.

FIG. 9 is a section view showing a construction of the optical apparatus 26 of the third embodiment.

As shown in FIG. 9, the second transparent electrode 52 includes multiple divided electrodes 53 similar in size and shape to the divided electrodes 51 in the first transparent electrode 50.

At the sight in the direction of thickness, the divided electrodes 51 of the first transparent electrode 50 and the divided electrodes 53 of the second transparent electrode 52 are placed such that the contours can agree with each other.

The third transparent electrode 54 also includes multiple divided electrodes 55 similar in size and shape to the divided electrodes 57 in the fourth transparent electrode 56.

At the sight in the direction of thickness, the divided electrodes 55 of the third transparent electrode 54 and the divided electrodes 57 of the fourth transparent electrode 56 are placed such that the contours can agree with each other.

A dielectric layer 66 is provided between the second transparent electrode 52 and the first polarizing layer 58, and a dielectric layer 68 is provided between the third transparent electrode 54 and the second polarizing layer 60. The dielectric layers 66 and 68 contain a dielectric material that allows light to pass through like the dielectric layers 62 and 64, which can prevent an uneven electric field occurring between the adjacent divided electrodes 53 and 55 from being applied to the polarizing layers 58 and 60.

According to the third embodiment, the divided electrodes 51, 53, 55 and 57 are similar in size and shape.

Certainly in addition to the same effects as those of the second embodiment, the third embodiment provides the flexibility for defining the magnitude of the voltage to be applied to the first and second polarizing layers 58 and 60 since all of the first to fourth transparent electrodes 50, 52, 54 and 56 have the multiple divided electrodes 51, 53, 55 and 57. Thus, the gradients of the electric field distributions to be formed in the first and second polarizing layers 58 and 60, that is, the gradients of the refractive index distributions can be adjusted freely, which is advantageous for adjusting the amount of displacement of the optical path freely.

Fourth Embodiment

A fourth embodiment is a variation example of the third embodiment and is different from the third embodiment in the positions where divided electrodes are placed.

Figure 10:
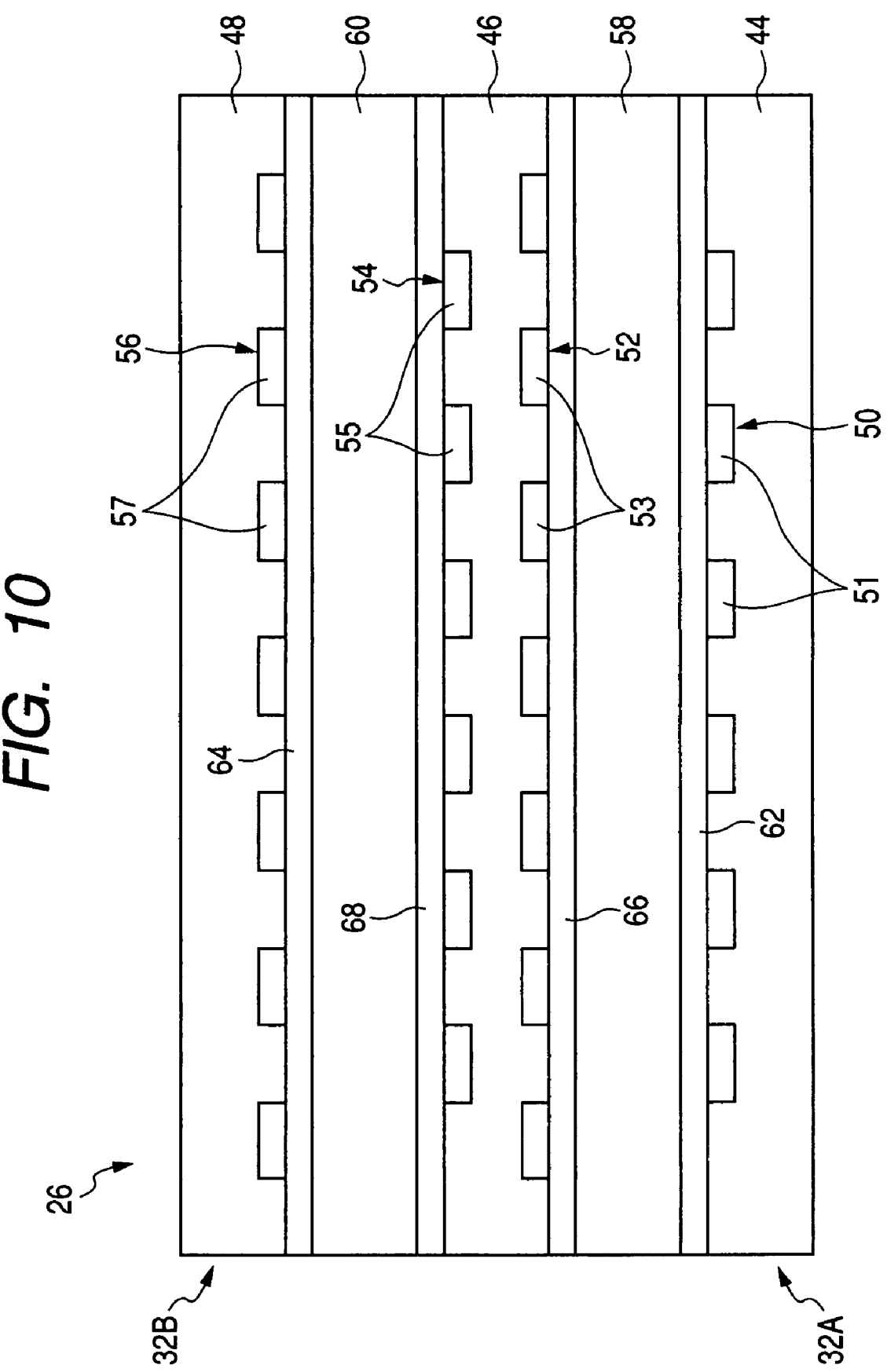
FIG. 10 is a section view showing a construction of an optical apparatus 26 according to a fourth embodiment.

FIG. 10 is a section view showing a construction of an optical apparatus 26 according to the fourth embodiment.

As shown in FIG. 10, like the third embodiment, the divided electrodes 51, 53, 55 and 57 of the first, second, third and fourth transparent electrodes 50, 52, 54 and 56 are similar in size and shape.

The adjacent divided electrodes are all spaced apart at uniform intervals in the first, second, third and fourth transparent electrodes 50, 52, 54 and 56.

At the sight from the direction of thickness, the divided electrodes 51 of the first transparent electrode 50 and the divided electrodes 53 of the second transparent electrode 52 are placed such that the contours do not overlap one another, that is, the divided electrodes 51 and 53 are placed alternately along the first direction.

At the sight from the direction of thickness, similarly, the divided electrodes 55 of the third transparent electrode 54 and the divided electrodes 57 of the fourth transparent electrode 56 are also placed such that the contours do not overlap one another, that is, the divided electrodes 55 and 57 are placed alternately along the first direction.

According to the fourth embodiment, certainly in addition to the same effects as those of the third embodiment, the divided electrodes 51 and 53 of the first transparent electrode 50 and second transparent electrode 52 are positioned alternately so as not to overlap one another, and the divided electrodes 55 and 57 of the third transparent electrode 54 and fourth transparent electrode 56 are positioned alternately so as not to overlap one another. Therefore, it is more advantageous for improving and making the light transmittance uniform than the third embodiment, which is advantageous for improving the optical characteristics of the optical apparatus 26.

It should be understood by those skilled in the art that various modifications, combinations, sub-combinations and alterations may occur depending on design requirements and other factors insofar as they are within the scope of the appended claims or the equivalents thereof.

What is claimed is:

1. An optical apparatus comprising:
a first optical element having a first polarizing layer containing a material having a refractive index that changes in accordance with the magnitude of applied voltage and first and second transparent electrodes sandwiching both sides of the first polarizing layer in the direction of thickness and polarizing light passing through the first polarizing layer in the direction of thickness; and
a second optical element having a second polarizing layer containing a material having a refractive index that changes in accordance with the magnitude of applied voltage and third and fourth transparent electrodes sandwiching both sides of the second polarizing layer in the direction of thickness and polarizing light passing through the second polarizing layer in the direction of thickness, wherein the first and second optical elements are placed one over another in the direction of thickness of the first and second polarizing layers; and wherein the first and second transparent electrodes are operable to apply a first voltage that changes in magnitude in a stepwise manner or continuously to the first polarizing layer along a first direction orthogonal to the direction of thickness, and the third and fourth transparent electrodes are operable to apply a second voltage that changes in magnitude in a stepwise manner or continuously to the second polarizing layer along the first direction such that an output light beam is parallel to an extension line of an input light beam and is displaced in the first direction when the light traveling in the direction of thickness of the first and second polarizing layers passes through the first and second polarizing layers in that order, in which the input light beam is the light beam inputted to the first polarizing layer and the output light beam is the light beam outputted from the second polarizing layer.

2. The optical apparatus according to claim 1, wherein:

the first and second polarizing layers have first and second electric field distributions, respectively, the magnitudes of which are changed by the first and second voltages in a stepwise manner or serially along the first direction;

the first and second polarizing layers have first and second refractive index distributions, respectively, the magnitudes of which change in a stepwise manner or serially in accordance with the first and second electric field distributions; and the light beams traveling in the direction of thickness of the first and second polarizing layers are polarized in accordance with the first and second refractive index distributions, respectively.

3. The optical apparatus according to claim, 2, wherein:

the gradients of the first and second refractive index distributions change linearly along the first direction;

the gradient of the first refractive index distribution and the gradient of the second refractive index distribution have opposite polarities having rates of change along the first direction; and the absolute values of the rates of change are equal.

4. The optical apparatus according to claim 1, wherein:

one of the first and second transparent electrodes includes multiple divided electrodes extending in the direction orthogonal to the first direction and spaced apart in the first direction;

the other of the first and second transparent electrodes includes a single electrode facing against all of the divided electrodes of the one transparent electrode;

one of the third and fourth transparent electrodes includes multiple divided electrodes extending in the direction orthogonal to the first direction and spaced apart in the first direction;

the other of the third and fourth transparent electrodes includes a single electrode facing against all of the divided electrodes of the one transparent electrode.

5. The optical apparatus according to claim 1, wherein:

both of the first and second transparent electrodes include multiple divided electrodes extending in the direction orthogonal to the first direction and spaced, apart in the first direction; and both of the third and fourth transparent electrodes include multiple divided electrodes extending in the direction orthogonal to the first direction and spaced apart in the first direction.

6. The optical apparatus according to claim 1, wherein:

both of the first and second transparent electrodes include multiple divided electrodes extending in the direction orthogonal to the first direction and spaced apart in the first direction; and both of the third and fourth transparent electrodes include multiple divided electrodes extending in the direction orthogonal to the first direction and spaced apart in the first direction; and at the sight from the direction of thickness of the first and second polarizing layers, the divided electrodes of the first transparent electrode and the divided electrodes of the second transparent electrode are placed alternately along the first direction; and the divided electrodes of the third transparent electrode and the divided electrodes of the fourth transparent electrode are placed alternately along the first direction.

7. The optical apparatus according to claim 4, 5 or 6, wherein a dielectric layer containing a dielectric material is further provided between the multiple divided electrodes and the first polarizing layer or the second polarizing layer that the multiple divided electrodes face.

8. The optical apparatus according to claim 1, wherein the material is a medium with an anisotropic refractive index.

9. The optical apparatus according to claim 1, wherein the material is liquid crystal, lithium tantalate or lithium niobate.

10. An imaging apparatus comprising:

a shooting optical system conducting a subject image;

an image sensor on an optical axis of the shooting optical system; and an optical apparatus before the image sensor on the optical axis, wherein the optical apparatus has:

a first optical element having a first polarizing layer containing a material having a refractive index that changes in accordance with the magnitude of applied voltage and first and second transparent electrodes sandwiching both sides of the first polarizing layer in the direction of thickness and polarizing light passing through the first polarizing layer in the direction of thickness; and a second optical element having a second polarizing layer containing a material having a refractive index that changes in accordance with the magnitude of applied voltage and third and fourth transparent electrodes sandwiching both sides of the second polarizing layer in the direction of thickness and polarizing light passing through the second polarizing layer in the direction of thickness, wherein the first and second optical elements are placed one over another in the direction of thickness of the first and second polarizing layers; and wherein the first and second transparent electrodes are operable to apply a first voltage that changes in magnitude in a stepwise manner or continuously to the first polarizing layer along a first direction orthogonal to the direction of thickness, and the third and fourth transparent electrodes are operable to apply a second voltage that changes in magnitude in a stepwise manner or continuously to the second polarizing layer along the first direction such that an output light beam is parallel to an extension line of an input light beam and is displaced in the first direction when the light traveling in the direction of thickness of the first and second polarizing layers passes through the first and second polarizing layers in that order, in which the input light beam is the light beam inputted to the first polarizing layer and the output light beam is the light beam outputted from the second polarizing layer.

* * * * *